Oct. 12, 1948.                J. H. BLAIR                    2,451,192
                         DENTAL TOOL ATTACHMENT
                          Filed Nov. 5, 1945
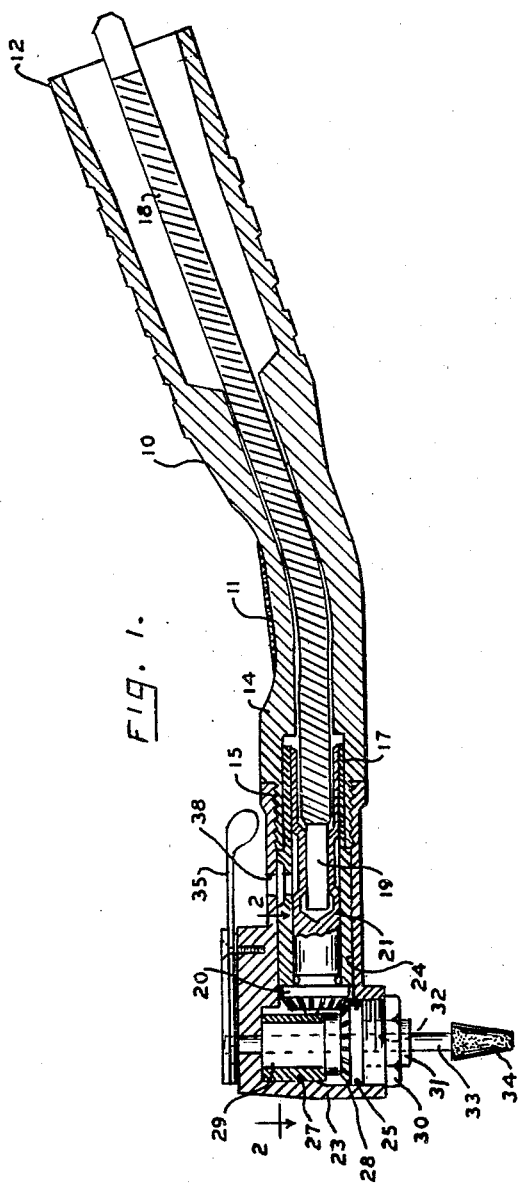
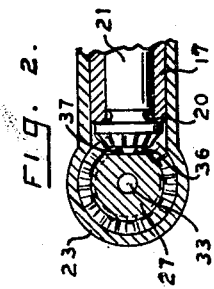
INVENTOR
JAMES H. BLAIR
BY
    Howard T. Jeandron
              ATTORNEY Patented Oct. 12, 1948

2,451,192

UNITED STATES PATENT OFFICE 2,451,192

DENTAL TOOL ATTACHMENT

James H. Blair, Prince Bay, Staten Island, N. Y., assignor to Chayes Dental Instrument Corporation, New York, N. Y.

Application November 5, 1945, Serial No. 626,801

1 Claim. (Cl. 32—27)

This invention relates to dental tools and more particularly to an improvement in counter-angle driving means for dental attachments.

This application is related to my previous Patent Number 2,043,028 for a Dental tool attachment issued June 2, 1936.

My former patent mentioned above shows a flexible drive shaft in a dental tool for driving an attachment that is mounted in alignment with the end of the flexible shaft. The principal feature of this patent was the use of a flexible drive shaft with a bent tubular sleeve to provide counter-angle driving means for a dental tool attachment.

It has been the practice in this art to provide a rigid shaft with angle gears in many devices of this type and especially where there is a forward or backward thrust on the shaft such as in all right angle drives or pinion gear drives. The use of a rigid shaft permits the bearings to take up the axial thrust and maintain the shaft in a fixed lineal relation insuring a perfect mesh of the angular gears used.

Although the rigid shaft gives a smooth perfectly balanced drive for tools requiring an angular drive, they are made up of a great many parts and require a very close tolerance in their fit.

An object of this invention is to provide a flexible shaft drive for angular fitted dental tools that insures the same smoothness of operation without requiring a close tolerance of fitting.

A further object of this invention is the method of obtaining a minimum degree of friction and back lash in a flexible shaft drive of a dental hand tool.

Other objects will be apparent by reference to the accompanying drawings and the detailed description in which Fig. 1 is a cross sectional view of the dental handpiece, and Fig. 2 is a cross sectional view on line 2—2 of Fig. 1.

Referring to the drawings, 10 indicates generally an elbow member of tubular form forming the protective casing for the flexible driving shaft, such member being provided with a slight bend as shown whereby the user of the instrument can so manipulate the attachment as to be able to operate efficiently in the inaccessible parts of a patient's mouth. A portion of the exterior may be formed with a rough texture as at 11 to assist the operator in maintaining a grip on the tool. One end of the member 10 is enlarged as at 12 to fit on the end of a dental handpiece (not shown). The other end as at 14 includes the elbow bend and has an external threaded portion 15. The interior of the tubular end 14 is fitted with a tubular bushing 17.

Inserted through the tubular member 10 is a flexible drive shaft 18 with a solid end portion 19. A gear 20 with a long tubular shank 21 is affixed to the solid end 19 of the flexible shaft 18.

A tubular housing 23 is threadably secured to the tubular member 10 at the end 14 on the threaded portion 15. The tubular housing 23 has two bores 24 and 25 disposed at right angles to each other, the bore 24 is large enough to pass the gear 20 therethrough and to fit snugly about the tubular bushing 17. The bushing 17 permits rotation of the flexible shaft and especially the shank 21 of the gear 20, but prevents axial movement due to any backlash in the flexible shaft. A bushing 27 is inserted in the bore 25 and a gear 28 having an upper shank 29 is rotatively mounted in the bore 25 so that the shank 29 fits into the bushing 27. The gear 28 meshes with the gear 20 and is rotatably driven by same. A lock nut 30 is threadably secured to the internal bore 25 and fits over a lower shank 31 of the gear 28 to hold it in its meshed position. A bore 32 passes through the gear 28 as well as the portion of the housing 23, into this bore the shank 33 of a tool 34 is inserted and keyed in a conventional manner. The shank 33 is also locked by a pivoted lock member 35 to prevent axial movement while allowing free rotation.

Referring to Fig. 2 the bushing 27 has a flat side 36 against which a small rounded butt end 37 of gear 20 bears, this fixes the gear 20 between bushings 17 and 27 and insures a set axial position during rotation.

It will be noted that bushing 17 abuts against the shoulder of the end 15 of member 10. This locks bushing 17 in a fixed position so that it will take up any end thrust from gear 20. An oil port 38 is provided to permit lubricating the rotatable shank 21 of the gear 20.

The assembly of the foregoing parts of the complete tool is accomplished in substantially the following fashion: The tubular end 21 of gear 20 is affixed to the end 19 of shaft 18 (in any conventional manner). The bushing 17 is slipped over the flexible shaft 18 so that its larger end abuts against the gear 20, this sub-assembly is now ready for installation in the housing. The unattached end of shaft 18 is now passed through the housing 10 until the shoulder of the bushing 17 abuts against the shoulder of the threaded portion 15. This assembly is then threaded to the end housing 23 by passing the gear 20 through the bore 24 until the threaded portion of 23 of bore 24 is drawn up tight. The end housing 23 also has a bore 25 into which a bushing 27 must be mounted before assembly, the bushing 27 must have the flat side 36 facing the gear 20 so that the butt end 37 will bear against the flat side 36. The gear 28 is next inserted so that shank 29 fits into and is rotatable in bushing 27, gear 28 will mesh with the gear 20. When the gear is in place the lock nut 30 is threadably inserted and drawn up to abut the gear 28, the lock nut will have the lower shank of the gear 28 projecting therethrough. To install a dental tool 34 such as that shown the shaft 33 is passed into the bore or keyway 32 and the pivotal lock 35 is released until the groove in the shaft 33 aligns with the lock 35, it is then snapped into its lock groove to hold the shaft 33 and prevent axial movement but allow rotation.

From the foregoing it will be apparent that the present invention provides a new type of right angle dental tool drive with a flexible shaft in which the backlash is eliminated. It will be apparent, of course, that other modifications can be made in the structure or in its use without departing from the spirit of this invention in which

I claim:

An attachment of the character described including a dental tool, a tapered tubular casing having an end housing in which a pinion gear drive is disposed at 90° from the main drive shaft in the tapered tubular casing, said main shaft being made up of a solid portion which is affixed to a pinion gear and a flexible shaft extending from the solid portion through said casing into position to be engaged by a rotatable driving means, said first pinion gear having a butt end to bear against a flat side of the bushing holding said second pinion gear said tapered tubular casing being bent in elbow form but the inner periphery of the tubular form centering said flexible shaft to insure a concentric drive of said pinion gear, a second pinion gear in said end housing rotatably mounted to mesh with said first mentioned pinion gear, said second mentioned pinion gear having a bore to hold and drive the shank of a dental tool, means to retain said pinion gears in mesh during any back lash in the flexible portion of said drive shaft.

JAMES H. BLAIR.

REFERENCES CITED

The following references are of record in the file of this patent:

UNITED STATES PATENTS

| Number | Name | Date |
|---|---|---|
| 1,380,717 | Herman | June 7, 1921 |
| 1,740,796 | Terry | Dec. 24, 1929 |
| 1,838,982 | Angell | Dec. 29, 1931 |
| 2,005,849 | Skinner | June 25, 1935 |
| 2,043,028 | Blair | June 2, 1936 |
| 2,263,808 | Hutchinson | Nov. 25, 1941 |